US011391252B2

United States Patent
Gautam et al.

(10) Patent No.: US 11,391,252 B2
(45) Date of Patent: Jul. 19, 2022

(54) TURBOCHARGER SYSTEM INCLUDING ACOUSTIC DAMPER FOR ATTENUATING AERODYNAMICALLY GENERATED NOISE FROM COMPRESSOR

(71) Applicant: Garrett Transportation I Inc., Torrance, CA (US)

(72) Inventors: Bhushan Singh Gautam, Bangalore (IN); Hani Mohtar, Chaumousey (FR); Alexandre Rigault, Richardmenil (FR); Chaitanya Bhat, Bangalore (IN); Stephane Pees, Meurthe-et-Moselle (FR)

(73) Assignee: Garrett Transportation I Inc., Torrance, CA (US)

( * ) Notice: Subject to any disclaimer, the term of this patent is extended or adjusted under 35 U.S.C. 154(b) by 837 days.

(21) Appl. No.: 16/221,525

(22) Filed: Dec. 16, 2018

(65) Prior Publication Data

US 2020/0191103 A1    Jun. 18, 2020

(51) Int. Cl.
  *F02M 35/12* (2006.01)
  *F02M 35/10* (2006.01)
  *F02B 77/13* (2006.01)

(52) U.S. Cl.
  CPC .. *F02M 35/1261* (2013.01); *F02M 35/10157* (2013.01); *F02B 77/13* (2013.01)

(58) Field of Classification Search
  CPC .... F02M 35/12; F02M 35/10; F02M 35/1261; F02M 35/1266; F02M 35/10157;
  (Continued)

(56) References Cited

U.S. PATENT DOCUMENTS 5,333,576 A    8/1994  Verkleeren
6,918,740 B2   7/2005  Liu
(Continued)

FOREIGN PATENT DOCUMENTS

DE   202013011555 U1   4/2014
EP      3361084 A1    8/2018

OTHER PUBLICATIONS

Extended European Search Report in EP Appl. No. 19207591.9-1007, dated Apr. 5, 2020.
(Continued)

*Primary Examiner* — Grant Moubry
(74) *Attorney, Agent, or Firm* — John C. James (57) ABSTRACT

A turbocharger includes an acoustic damper for attenuating noise from the compressor. The damper includes inner and outer duct walls defining an annular cavity therebetween, the outer duct being longer than the inner duct. An upstream wall bounds the annular cavity at the upstream end and defines an inlet aperture for fluid to pass through into the inner duct, and a downstream wall is axially spaced from the downstream end of the inner duct so as to define an expansion chamber fluidly connected to the annular cavity. The downstream wall defines an outlet aperture for the fluid. Partition walls between the two ducts partition the annular cavity into at least a first Helmholtz resonator and a first quarter-wave resonator that are axially serially arranged, and a second quarter-wave resonator that is circumferential serially arranged with respect to the first Helmholtz resonator.

12 Claims, 6 Drawing Sheets

(58) Field of Classification Search
CPC ........ F02B 77/13; F02B 37/00; F04D 29/665; F04D 29/663; F01N 1/02; F01N 1/023; F01N 1/026; F01N 2210/02
See application file for complete search history.

(56) References Cited

U.S. PATENT DOCUMENTS

| | | | |
|---|---|---|---|
| 6,983,820 B2* | 1/2006 | Boast | F01N 1/003 |
| | | | 181/232 |
| 7,604,467 B2* | 10/2009 | Prior | F02B 33/38 |
| | | | 123/559.1 |
| 7,779,822 B2* | 8/2010 | Prior | F02M 35/104 |
| | | | 123/559.1 |
| 8,651,800 B2* | 2/2014 | Li | F02M 35/1216 |
| | | | 415/71 |
| 9,175,648 B2 | 11/2015 | Dobrin et al. | |
| 10,247,203 B2* | 4/2019 | Ono | F04D 25/024 |
| 10,247,420 B2* | 4/2019 | Bothien | F23R 3/06 |
| 2003/0173146 A1* | 9/2003 | Wolf | F02M 35/1211 |
| | | | 181/224 |
| 2018/0231028 A1* | 8/2018 | Gautam | F02M 35/10157 |
| 2018/0245553 A1* | 8/2018 | Lee | F02M 35/1255 |

OTHER PUBLICATIONS

"Design of Quarter Wave Tube for Engine Intake Noise Attenuation by Finite Element Analysis", Mehmet Caliskan et al., presented at inter-noise 2009 Conference, Aug. 23-26, 2009.

* cited by examiner

TURBOCHARGER SYSTEM INCLUDING ACOUSTIC DAMPER FOR ATTENUATING AERODYNAMICALLY GENERATED NOISE FROM COMPRESSOR

BACKGROUND OF THE INVENTION

The present disclosure relates to turbochargers, and relates more particularly to turbochargers that include noise treatments for attenuating aerodynamically generated noise from the turbocharger.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

Turbochargers typically employ a compressor wheel of the centrifugal (also known as "radial") type because centrifugal compressors can achieve relatively high pressure ratios in a compact arrangement. Intake air for the compressor is received in a generally axial direction at an inducer portion of the centrifugal compressor wheel and is discharged in a generally radial direction at an exducer portion of the wheel. The compressed air from the wheel is delivered to a volute, and from the volute the air is supplied to the intake of an internal combustion engine.

A turbocharger compressor tends to produce aerodynamically generated noise. Typically, the noise comprises a spectrum of various frequencies, and the sound pressure level is relatively greater at certain frequencies than at other frequencies. Noise treatments for turbocharger compressors generally must be compact in size because the free space available within a vehicle engine compartment typically is quite small. Attenuating multiple frequency components effectively with a space-efficient noise treatment device is the challenge to which the present invention is directed.

BRIEF SUMMARY OF THE DISCLOSURE

The present application relates to a turbocharger system that includes an acoustic damper configured to attenuate noise at a plurality of different frequencies. In accordance with one embodiment described herein, a turbocharger system comprises:

a turbocharger comprising a turbine including a turbine housing, and a compressor including a compressor housing, the compressor housing defining an air inlet for conducting air into the compressor and a discharge pipe for conducting pressurized air out from the compressor; and an acoustic damper coupled to one of the air inlet and the discharge pipe of the compressor, the acoustic damper comprising:

an upstream wall defining an inlet aperture therein;

a downstream wall defining an outlet aperture therein, the inlet and outlet apertures being spaced apart a distance D along an axial direction along which the fluid flows;

an inner duct for conducting the fluid received through the inlet aperture, the inner duct comprising an inner duct wall supported on the upstream wall and extending downstream from the upstream wall for a length L which is less than D;

an outer duct comprising an outer duct wall extending between the upstream wall and the downstream wall, the outer duct wall surrounding the inner duct wall such that an annular cavity is defined between the inner and outer duct walls, an expansion chamber being bounded between the downstream wall, the outer duct wall, and a downstream end of the inner duct wall, and wherein the annular cavity at a downstream end thereof is open to the expansion chamber; and partition walls that extend between the inner and outer duct walls and partition the annular cavity into at least first and second quarter-wave resonators that are open to the expansion chamber and at least a first Helmholtz resonator, the inner duct wall defining at least one hole therethrough connecting the first Helmholtz resonator with an interior of the inner duct, wherein the first quarter-wave resonator and the first Helmholtz resonator are axially serially arranged with respect to each other, and the second quarter-wave resonator and the first Helmholtz resonator are circumferentially serially arranged with respect to each other.

In accordance with the invention, the two quarter-wave resonators can be tuned to two different frequencies, and the Helmholtz resonator can be tuned to yet another different frequency, such that the damper selectively attenuates noise components of three different frequencies. Thus, in one embodiment of the invention, the first and second quarter-wave resonators have resonator lengths L1 and L2 respectively, and L1 is less than L2. In some embodiments L2 can be equal to L.

The acoustic damper can be configured to attenuate noise at more than two or three different frequencies. In some embodiments, the partition walls further partition the annular cavity into a third quarter-wave resonator and a second Helmholtz resonator, the inner duct wall defining at least one hole therethrough connecting the second Helmholtz resonator with the interior of the inner duct. The first, second, and third quarter-wave resonators are circumferentially serially arranged with respect to each other, and the first and second Helmholtz resonators are circumferentially serially arranged with respect to each other. The acoustic damper thus potentially can attenuate noise at up to five different frequencies.

In still other embodiments, the partition walls further partition the annular cavity into a fourth quarter-wave resonator and a third Helmholtz resonator, the inner duct wall defining at least one hole therethrough connecting the third Helmholtz resonator with the interior of the inner duct, and wherein the first, second, third, and fourth quarter-wave resonators are circumferentially serially arranged with respect to each other, and the first, second, and third Helmholtz resonators are circumferentially serially arranged with respect to each other.

In yet other embodiments, the partition walls further partition the annular cavity into a fifth quarter-wave resonator and a sixth quarter-wave resonator, wherein the first, second, third, fourth, fifth, and sixth quarter-wave resonators are circumferentially serially arranged with respect to each other. In these embodiments, the third quarter-wave resonator and the second Helmholtz resonator can be axially serially arranged with respect to each other, and the fifth quarter-wave resonator and the third Helmholtz resonator can be axially serially arranged with respect to each other.

The first, third, and fifth quarter-wave resonators each can have a resonator length L1, wherein L1 is less than L. The second, fourth, and sixth quarter-wave resonators each can have a resonator length L2, wherein L2 is greater than L1. In some embodiments, L2 is equal to L.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DRAWINGS

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
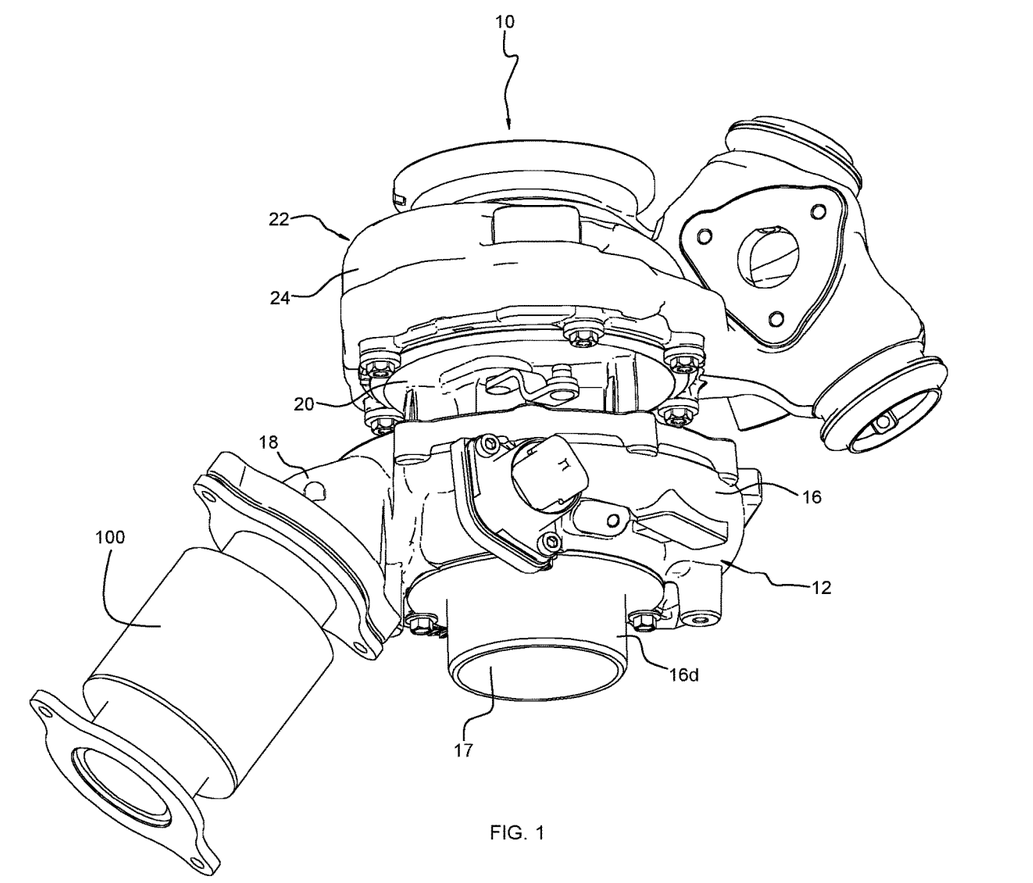
FIG. 1 is an isometric view of a turbocharger system including a turbocharger and an acoustic damper coupled to the discharge pipe from the turbocharger compressor, in accordance with one embodiment of the invention.

A turbocharger system in accordance with an embodiment of the invention is illustrated in FIG. 1. The turbocharger system includes a turbocharger 10 coupled with an acoustic damper 100. The turbocharger comprises a compressor 12 and a turbine 22. The compressor includes a compressor housing 16 that contains a compressor wheel (not shown), and the turbine includes a turbine housing 24 that contains a turbine wheel (not shown). The compressor and turbine wheels are both mounted on the same shaft (not shown), which is supported by bearings within a center housing 20 disposed between the compressor housing 16 and the turbine housing 24. Engine exhaust gases supplied into the turbine housing 24 are directed into the turbine wheel, which is rotatably driven by the gases and which drives the compressor wheel to compress air for supply to the engine (not shown). The compressor housing can include an inlet duct member 16d defining an air inlet 17 for the air being supplied to the compressor wheel. The compressor housing also includes a discharge pipe 18 for leading the air that has been pressurized by the compressor wheel out from the compressor housing for supply to the engine.

In the embodiment of FIG. 1, the acoustic damper 100 is coupled to the discharge pipe 18 of the compressor. The pressurized air from the compressor passes through the acoustic damper and is then supplied to the engine.

Figure 2:
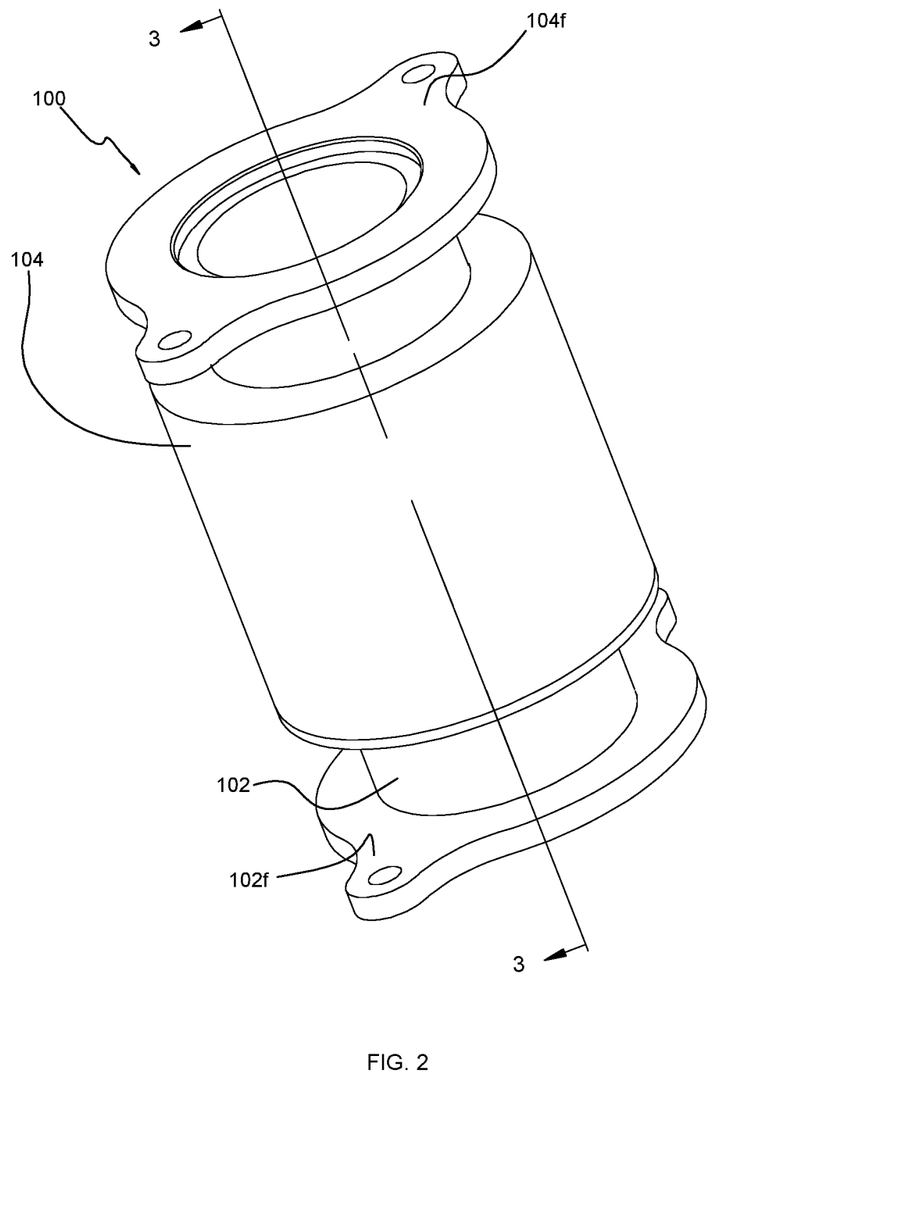
FIG. 2 is an isometric view of the acoustic damper according to one embodiment of the invention.
Figure 3:
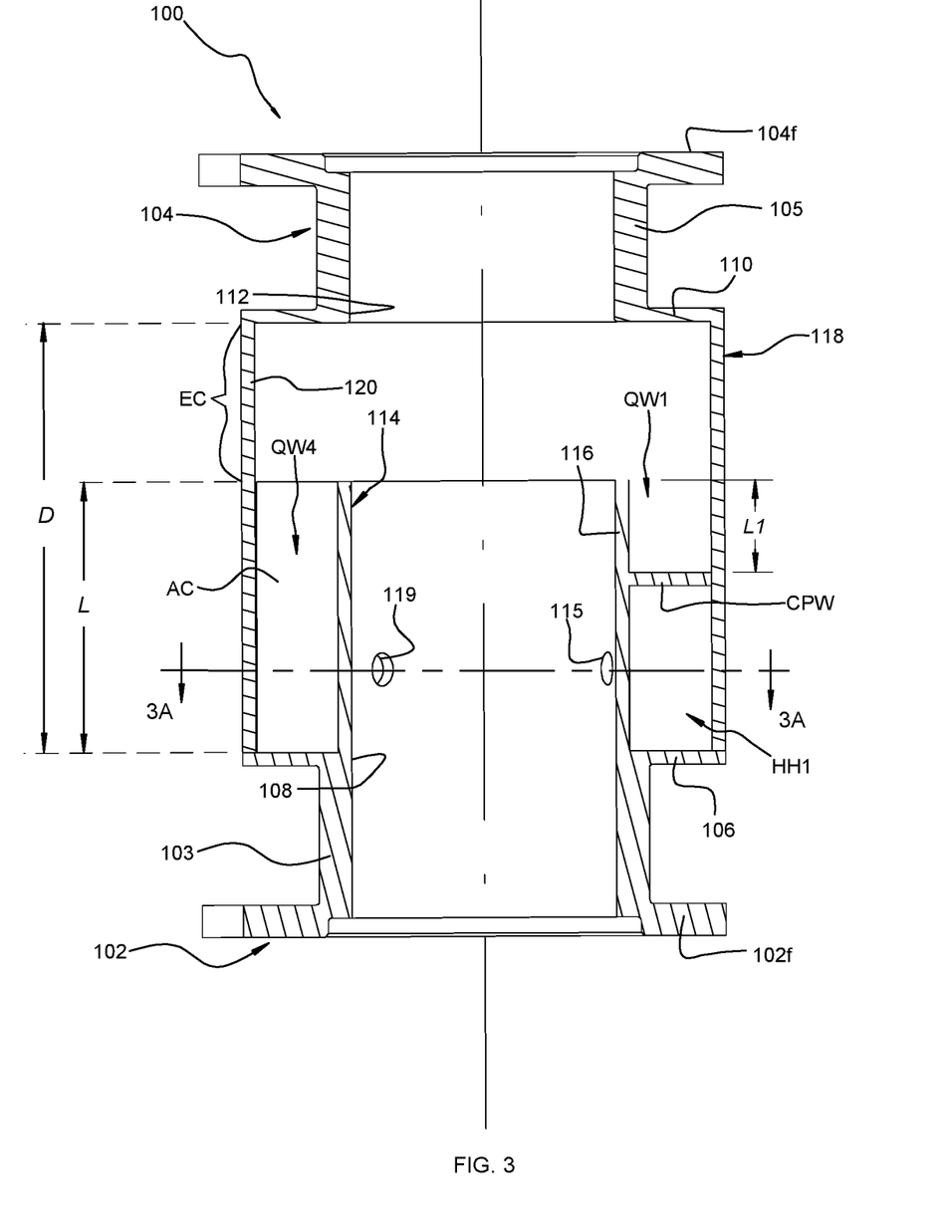
FIG. 3 is a cross-sectional view through the damper along line 3-3 in FIG. 2.
Figure 4:
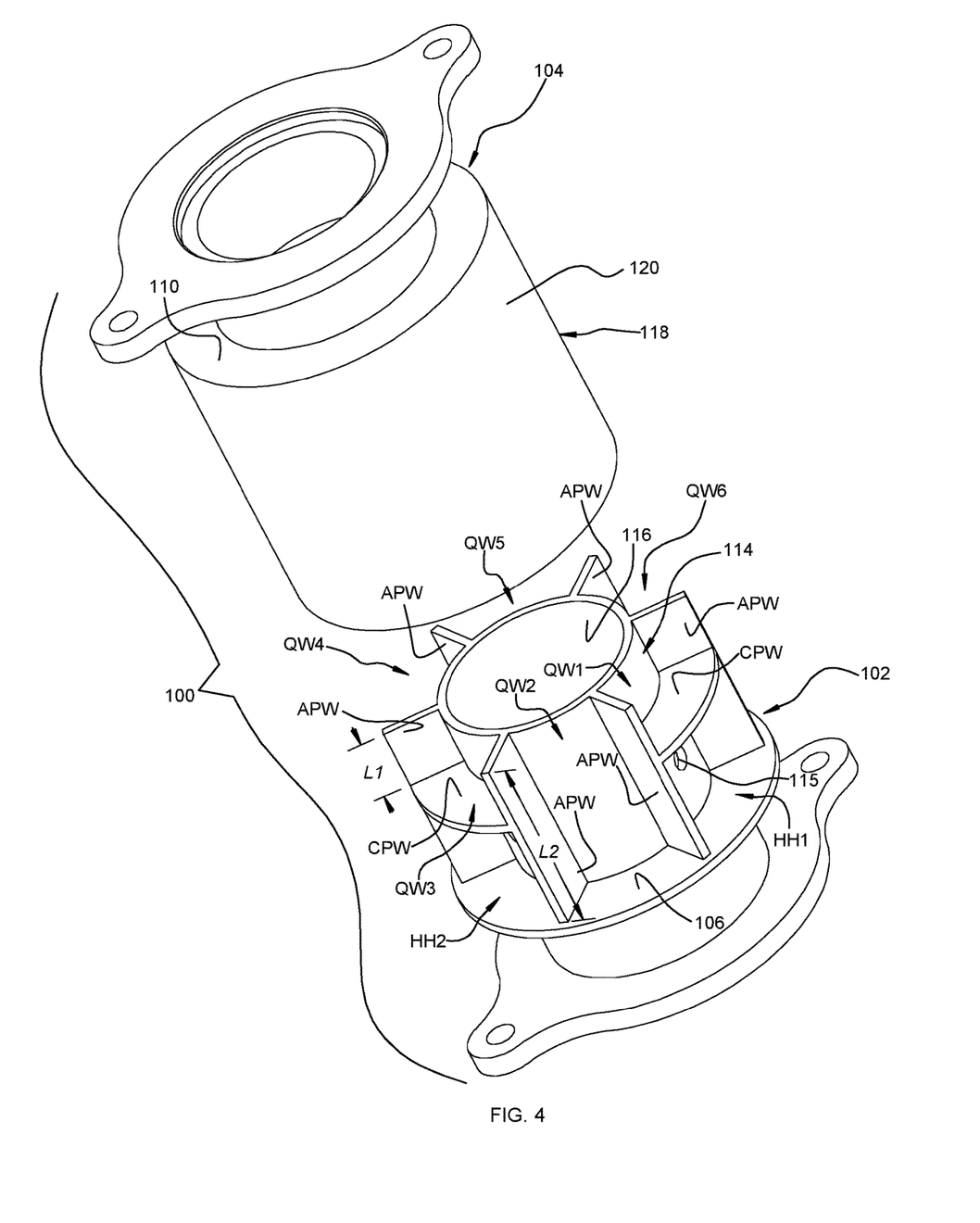
FIG. 4 is an exploded view of the acoustic damper of FIG. 2.

With reference to FIGS. 2 through 4, the acoustic damper 100 in the illustrated embodiment includes an inlet member 102 and an outlet member 104 that are formed separately from each other and are assembled together to make the acoustic damper. The inlet member 102 includes an upstream wall 106 that defines an inlet aperture 108 therethrough. An inlet pipe 103 is joined to the upstream wall 106 for feeding air through the inlet aperture 108. The inlet pipe's upstream end defines a mounting flange 102f. The inlet member 102 further includes an inner duct 114 for conducting the fluid received through the inlet aperture 108, the inner duct comprising an inner duct wall 116 supported on the upstream wall 106 and extending downstream from the upstream wall for a length L (FIG. 3).

The outlet member 104 includes a downstream wall 110 that defines an outlet aperture 112 therethrough. An outlet pipe 105 is joined to the downstream wall 110 for receiving fluid that exits through the outlet aperture 112. The outlet pipe's downstream end defines a mounting flange 104f. The outlet member 104 further includes an outer duct 118 supported by the downstream wall 110. The outer duct is defined by an outer duct wall 120, which has a larger diameter than that of the inner duct wall 116. The inlet member 102 and outlet member 104 are assembled together in "telescope" fashion, the outer duct wall 120 being sleeved over and around the inner duct wall 116. The outer duct is longer than the inner duct, and the free end of the outer duct wall 120 abuts the upstream wall 106, resulting in there being a spacing distance D between the upstream wall 106 and the downstream wall 110, wherein D is greater than the length L of the inner duct 114. Consequently, an annular cavity AC is defined between the outer and inner ducts, and an expansion chamber EC is defined between the downstream wall 110, the outer duct wall 120, and the downstream end of the inner duct 114, as best seen in FIG. 3. The annular cavity at a downstream end thereof is open to the expansion chamber.

Figure 3A:
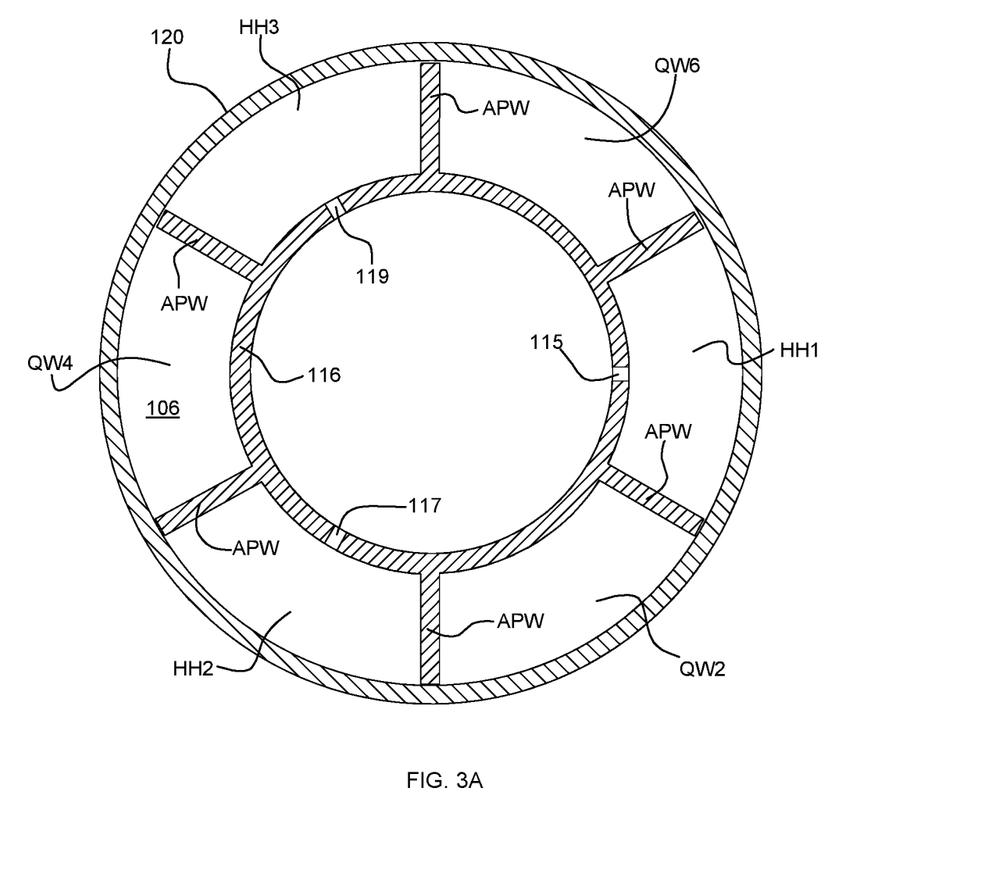
FIG. 3A is a cross-sectional view along line 3A-3A in FIG. 3.

With primary reference to FIGS. 3A and 4, The acoustic damper 100 includes partition walls APW and CPW that extend between the inner and outer duct walls and partition the annular cavity AC into a series of acoustic resonators for attenuating noise at certain frequencies depending on the characteristic dimensions of each resonator. More particularly, the partition walls include axial partition walls APW that extend axially and radially (i.e., each axial partition wall lies in an r-z plane with respect to a cylindrical coordinate system having the z-axis coincident with a central axis of the acoustic damper), as well as one or more circumferential partition walls CPW that extend circumferentially and radially (i.e., each one lying in an r-θ plane of the cylindrical coordinate system). The illustrated embodiment includes axial and circumferential partition walls that partition the annular cavity into nine resonators, six of which are quarter-wave resonators and three of which are Helmholtz resonators. More generally, however, the invention is not limited to any particular number of resonators, except that in accordance with the invention the partition walls define at least first and second quarter-wave resonators, QW1 and QW2, which are open to the expansion chamber EC, and at least a first Helmholtz resonator HH1. The inner duct wall 116 defines at least one hole 115 therethrough connecting the first Helmholtz resonator HH1 with an interior of the inner duct 114. In accordance with the invention, the first quarter-wave resonator QW1 and the first Helmholtz resonator HH1 are axially serially arranged with respect to each other, the Helmholtz resonator being upstream of the quarter-wave resonator, and the second quarter-wave resonator QW2 and the first Helmholtz resonator HH1 are circumferentially serially arranged with respect to each other (the terms "axially", "circumferentially", and "radially" throughout this description being defined with respect to the above-noted cylindrical coordinate system). Thus, in this embodiment (not specifically illustrated in the drawings), there are two axial partition walls APW circumferentially spaced part by an amount determined based on desired acoustic resonance characteristics of the various resonators, and a single circumferential partition wall CPW that separates the first Helmholtz resonator from the first quarter-wave resonator. Accordingly, the first Helmholtz resonator is bounded in the axial direction between the upstream wall 106 and the circumferential partition wall CPW, is bounded in the radial direction between the inner duct wall 116 and the outer duct wall 120, and is bounded in the circumferential direction between the two axial partition walls APW.

It will be understood based on this general description that any desired number of resonators can be defined by the partition walls. Thus, for example, any of the following configurations of resonators can be defined, these being exemplary only and not by way of limitation: Configuration 1: QW1-HH1-QW2; Configuration 2: QW1-HH1-QW2-QW3-HH2; Configuration 3: QW1-HH1-QW2-QW3-HH2-QW4-HH3; Configuration 4: QW1-HH1-QW2-QW3-HH2-QW4-HH3-QW5-QW6. It will be understood that each Helmholtz resonator must be isolated from the expansion chamber EC and each quarter-wave resonator must be open to the expansion chamber. This serves to constrain how different types of resonators can be axially serially arranged; more particularly, if there are Helmholtz and quarter-wave resonators axially serially arranged, the quarter-wave resonator must be the downstream one so that it can be open to the expansion chamber. However, with respect to how the resonators are circumferentially arranged, there is no particular constraint in this regard. The description will now focus on the illustrated embodiment (Configuration 4) having nine resonators as previously noted.

With reference to FIGS. 3A and 4, the various resonators are described proceeding clockwise in FIGS. 3A and 4. As noted, there is a circumferential partition wall CPW that divides the first Helmholtz resonator HH1 from the first quarter-wave resonator QW1, and there are two axial partition walls APW that bound the circumferential extent of these two resonators (their circumferential lengths being equal). The axial location of this circumferential partition wall determines the relative axial lengths of the first Helmholtz resonator and first quarter-wave resonator. A second quarter-wave resonator QW2 is bounded by a further axial partition wall APW spaced circumferentially away in the clockwise direction, the second quarter-wave resonator extending the full length of the inner duct 114. Next in the clockwise direction, there are a second Helmholtz resonator HH2 and a third quarter-wave resonator QW3 axially serially arranged, followed by a fourth (full-length) quarter-wave resonator QW4, and then a third Helmholtz resonator HH3 and fifth quarter-wave resonator QW5 axially serially arranged, and finally a sixth quarter-wave resonator QW6. A hole 115 in the inner duct wall leads from the inner duct interior into the first Helmholtz resonator HH1, and similar holes 117 and 119 are provided respectively for the second and third Helmholtz resonators. It will be understood that one or more of the Helmholtz resonators can have more than one hole.

The characteristic dimensions of the various resonators can be selected so that each resonator is configured to attenuate a particular noise frequency component. As those skilled in the art will recognize, the frequency to which a Helmholtz resonator is tuned is primarily a function of the volume V of the chamber, the length of the neck that leads from the main fluid duct into the resonator chamber, and the cross-sectional area of the neck. In the present context, the neck length is determined by the radial thickness of the inner duct wall 116, and thus there is not much latitude to vary this parameter. However, the neck area is determined by the diameter of the hole (115, 117, 119) as well as the number of such holes per chamber, and the chamber volume is determined by the radial spacing between the inner and outer duct walls, the circumferential spacing between the axial partition walls APW, and the axial spacing between the upstream wall 106 and the circumferential partition wall CPW for each chamber. Thus, the neck areas and chamber volumes of the various Helmholtz resonators can be selected as desired to achieve attenuation of whatever noise frequencies are problematic in the particular installation of the acoustic damper. As an example, in the illustrated embodiment, all three Helmholtz resonators have the same chamber volumes and neck dimensions, but alternatively they can be tuned to three different frequencies by suitably selecting the characteristic parameters.

With respect to the quarter-wave resonators, those skilled in the art will recognize that the frequency targeted by a quarter-wave resonator is determined by the length of the chamber. In the present context, this length is the axial dimension between the open end of the quarter-wave resonator adjacent the expansion chamber EC and the circumferential partition wall CPW or upstream wall 106 bounding the opposite axial end of the resonator. Thus, the first, third, and fifth quarter-wave resonators have a length of L1 (FIG. 4) and hence will be tuned to a first frequency, while the second, fourth, and sixth quarter-wave resonators have a length of L2 (equal to the length L of the inner duct) and hence will be tuned to a second frequency that is lower than the first frequency. It is possible within the scope of the invention to tune the quarter-wave resonators to more than two different frequencies by tailoring their axial lengths as needed, by employing one or more additional circumferential partition walls to bound the upstream end of one or more of the quarter-wave resonators.

The acoustic damper in accordance with the invention enables the designer to selectively attenuate multiple frequency components using a single device that is space-efficient and that incurs little total pressure loss for the fluid flowing through the device.

Figure 5:
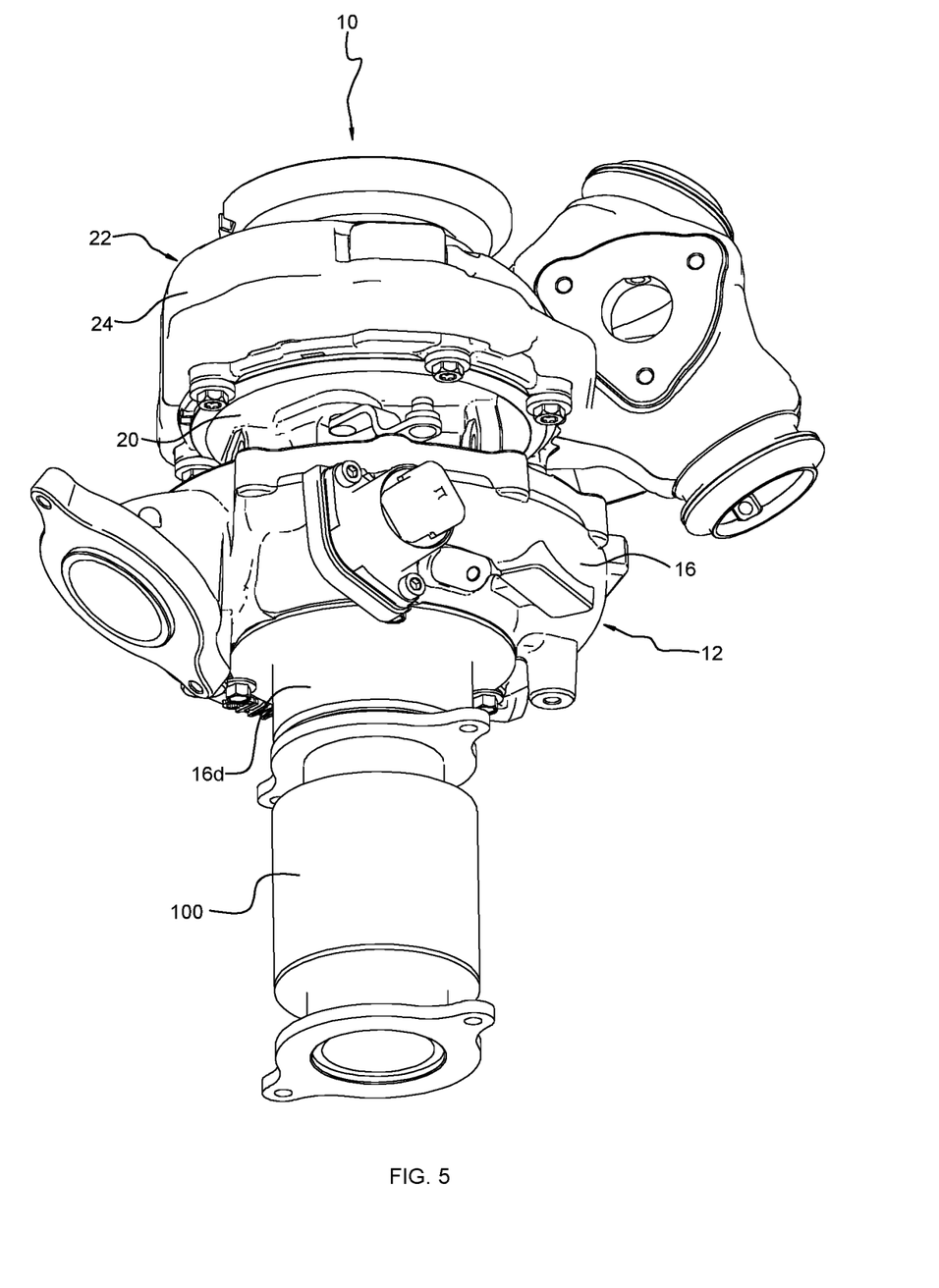
FIG. 5 is an isometric view of a turbocharger system including a turbocharger and an acoustic damper coupled to the air inlet of the turbocharger compressor, in accordance with a further embodiment of the invention.

FIG. 5 illustrates a further turbocharger system that is similar to that of FIG. 1, except that the acoustic damper 100 is arranged upstream of the inlet for the compressor 12 instead of downstream of the compressor discharge. Thus, air to be supplied to the inlet duct 16d of the compressor first passes through the acoustic damper 100 before proceeding through the inlet duct to the compressor wheel. In accordance with the invention, the acoustic damper is not limited to any particular location within the fluid-handling system of interest. The relatively compact size of the acoustic damper makes it suitable for use in a variety of potential locations within the overall system.

Many modifications and other embodiments of the inventions set forth herein will come to mind to one skilled in the art to which these inventions pertain having the benefit of the teachings presented in the foregoing descriptions and the associated drawings. For example, while the illustrated embodiment of the acoustic damper has nine acoustic resonators, alternatively the damper could have fewer or a greater number of resonators. Modifications as specifically noted herein can be made, and other modifications not specifically noted herein but apparent to those skilled in the art can also be made. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger system, comprising:
   a turbocharger comprising a turbine including a turbine housing, and a compressor including a compressor housing, the compressor housing defining an air inlet for conducting air into the compressor and a discharge pipe for conducting pressurized air out from the compressor; and
   an acoustic damper coupled to one of the air inlet and the discharge pipe of the compressor, the acoustic damper comprising:
      an upstream wall defining an inlet aperture therein;
         a downstream wall defining an outlet aperture therein, the inlet and outlet apertures being spaced apart a distance D along an axial direction along which the fluid flows;
         an inner duct for conducting the pressurized air received through the inlet aperture, the inner duct comprising an inner duct wall supported on the upstream wall and extending downstream from the upstream wall for a length L which is less than D;
         an outer duct comprising an outer duct wall connected between the upstream wall and the downstream wall, the outer duct wall surrounding the inner duct wall such that an annular cavity is defined between the inner and outer duct walls, an expansion chamber being bounded between the downstream wall, the outer duct wall, and a downstream end of the inner duct wall, and wherein the annular cavity at a downstream end thereof is open to the expansion chamber; and
      partition walls that extend between the inner and outer duct walls and partition the annular cavity into at least first and second quarter-wave resonators that are open to the expansion chamber and at least a first Helmholtz resonator, the inner duct wall defining at least one hole therethrough connecting the first Helmholtz resonator with an interior of the inner duct, wherein the first quarter-wave resonator and the first Helmholtz resonator are axially serially arranged with respect to each other, and the second quarter-wave resonator and the first Helmholtz resonator are circumferentially serially arranged with respect to each other.

2. The turbocharger system of claim 1, wherein the first and second quarter-wave resonators have resonator lengths L1 and L2 respectively, wherein L1 is less than L2.

3. The turbocharger system of claim 2, wherein L2 is equal to L.

4. The turbocharger system of claim 1, wherein the partition walls further partition the annular cavity into a third quarter-wave resonator and a second Helmholtz resonator, the inner duct wall defining at least one hole therethrough connecting the second Helmholtz resonator with the interior of the inner duct, wherein the first, second, and third quarter-wave resonators are circumferentially serially arranged with respect to each other, and wherein the first and second Helmholtz resonators are circumferentially serially arranged with respect to each other.

5. The turbocharger system of claim 4, wherein the partition walls further partition the annular cavity into a fourth quarter-wave resonator and a third Helmholtz resonator, the inner duct wall defining at least one hole therethrough connecting the third Helmholtz resonator with the interior of the inner duct, wherein the first, second, third, and fourth quarter-wave resonators are circumferentially serially arranged with respect to each other, and wherein the first, second, and third Helmholtz resonators are circumferentially serially arranged with respect to each other.

6. The turbocharger system of claim 5, wherein the partition walls further partition the annular cavity into a fifth quarter-wave resonator and a sixth quarter-wave resonator, wherein the first, second, third, fourth, fifth, and sixth quarter-wave resonators are circumferentially serially arranged with respect to each other.

7. The turbocharger system device of claim 6, wherein the third quarter-wave resonator and the second Helmholtz resonator are axially serially arranged with respect to each other, and wherein the fifth quarter-wave resonator and the third Helmholtz resonator are axially serially arranged with respect to each other.

8. The turbocharger system of claim 7, wherein the first, third, and fifth quarter-wave resonators each has a resonator length L1, wherein L1 is less than L.

9. The turbocharger system of claim 8, wherein the second, fourth, and sixth quarter-wave resonators each has a resonator length L2, wherein L2 is greater than L1.

10. The turbocharger system of claim 9, wherein L2 is equal to L.

11. The turbocharger system of claim 1, wherein the acoustic damper is coupled to the air inlet.

12. The turbocharger system of claim 1, wherein the acoustic damper is coupled to the discharge pipe.

* * * * *